US012655944B2

(12) United States Patent
Sun et al.

(10) Patent No.: US 12,655,944 B2
(45) Date of Patent: Jun. 16, 2026

(54) AIR BAG AIR-INFLATING AND AIR-PUMPING DEVICE

(71) Applicant: SHENZHEN ONETHIRD SLEEP TECHNOLOGY CO., LTD, Shenzhen (CN)

(72) Inventors: Chengjun Sun, Shenzhen (CN); Zhong Liu, Shenzhen (CN); Kuntao Lu, Shenzhen (CN); Yong Le, Shenzhen (CN)

(73) Assignee: DONGGUAN ONE-THIRD SLEEP TECHNOLOGY CO., LTD, Dongguan (CN)

( * ) Notice: Subject to any disclaimer, the term of this patent is extended or adjusted under 35 U.S.C. 154(b) by 313 days.

(21) Appl. No.: 17/913,848

(22) PCT Filed: Mar. 23, 2020

(86) PCT No.: PCT/CN2020/080703
§ 371 (c)(1),
(2) Date: Sep. 23, 2022

(87) PCT Pub. No.: WO2021/189199
PCT Pub. Date: Sep. 30, 2021

(65) Prior Publication Data
US 2023/0116236 A1 Apr. 13, 2023

(51) Int. Cl.
*F17C 13/04* (2006.01)

(52) U.S. Cl.
CPC ...... *F17C 13/04* (2013.01); *F17C 2205/0142* (2013.01); *F17C 2205/0326* (2013.01); *F17C 2221/031* (2013.01); *F17C 2227/0135* (2013.01)

(58) Field of Classification Search
CPC .............. F17C 13/04; F17C 2205/0142; F17C 2205/0326; F17C 2221/031; F17C 2227/0135
See application file for complete search history.

(56) References Cited

U.S. PATENT DOCUMENTS 4,915,124 A * 4/1990 Sember, III ............ A47C 7/467 297/DIG. 3
5,967,608 A * 10/1999 Van Sickle .............. B60N 2/64 297/284.6

FOREIGN PATENT DOCUMENTS

CN 106691049 A 5/2017

* cited by examiner

*Primary Examiner* — Angelisa L. Hicks
(74) *Attorney, Agent, or Firm* — Jose Cherson Weissbrot

(57) ABSTRACT

The present application relates to the technical field of air inflating and air pumping device, which providing an air bag air-inflating and air-pumping device that comprises an air valve unit, an air pump unit and an air-inflating and air-pumping switching valve unit; the air valve unit is connected to the air-inflating and air-pumping switching valve unit and the air-inflating and air-pumping switching valve unit is connected to the air pump unit, wherein the air valve unit comprises air valve sets and the air valve set comprises one air bag and one or two air valves; the air pump unit comprises an air inlet port and an air exhaust port to provide force for inflation and deflation; the air-inflating and air-pumping switching valve unit includes a triple valve.

3 Claims, 4 Drawing Sheets

AIR BAG AIR-INFLATING AND AIR-PUMPING DEVICE

CROSS-REFERENCE TO RELATED APPLICATIONS

The present application is a continuation of International Application No. PCT/CN2020/080703, with an international filing date of Mar. 23, 2020, the entire contents of which is incorporated herein by reference.

TECHNICAL FIELD

The present application relates to the technical field of air inflating and air pumping device, in particular, the present application related to an air bag air-inflating and air-pumping device.

BACKGROUND

In the prior art, an air bag can be formed as an air inflating and air pumping device by being connected to units such as an air pump, air valve and an air pipe. Since the air bag can adjust its height and hardness through air inflating and pumping by itself, so that the air-inflating and air-pumping device including it also has a corresponding adjustment function. Wherein, the inflation of the air bag is realized by using an air pump whose inflation speed (the inflation speed is constant) is in direct proportion to the air flow of the air pump and the number of the air pumps, so the air-inflating and air-pumping device on the market usually adopts an air pump with larger air flow or a plurality of air pumps connected in parallel, so that the air bag has fast enough inflation speed. However, for the deflation of the air bag, since the existing air bag is generally in a simple structure—each airbag is connected to an air pipe, the air pipe is linked with an air value and an air pump which are used to control the operation of air inflating and air pumping of each air bag—the deflation of the airbag is always practiced in a natural way, that is opening the air value connected to the airbag and discharging the air in the airbag into the air through the effect of the air pressure difference.

The natural deflation of the air bag has the problems of slow deflation speed, inconstant deflation speed and the deflation speed limited by the smallest caliber in the air channel. To begin with, when the acting force on the air bag is small, the air in the air bag gradually decreases with the increase of deflation time, and the external pressure applied to the air bag will be relieved and the deflation speed will slow down at the same time. Especially when the air pressure in the air bag is slightly higher than the atmospheric pressure, the deflation speed of the air bag is very slow with very weak adjustment effect of the air bag. Besides, the deflation speed of the airbag is inconstant in a natural deflation way, and the air pressure in the air bag will change along with the deflation, which set up barriers for accurate control of the air bag deflation. Finally, the air bag deflation rate is affected by the smallest caliber in the air channel. For instance, although the size of the exhaust port of the air bag is set very big, the deflation speed is usually still not fast enough, because the deflation speed is also related to the minimum diameter of the air channel and the deflation speed is usually determined by the smallest caliber of the internal deflation of the air valve. Given the air tightness of the air valve, the outlet port of the air valve is usually set with a small caliber. These technical problems impact the use effect and need further improvement.

SUMMARY

The embodiment of the present application aims to provide a device with high inflation and deflation speed and constant deflation speed of an air bag, in order to solve the problems of slow deflation speed in natural deflation, inconstant deflation speed and the deflation speed limited by the smallest caliber in the air channel.

The embodiment of the present application is achieved as follows: providing an air bag air-inflating and air-pumping device including an air valve unit, an air pump unit and an air-inflating and air-pumping switching valve unit. The air valve unit is connected to the air-inflating and air-pumping switching valve unit and the air-inflating and air-pumping switching valve unit is connected to the air pump unit, wherein the air valve unit comprises air valve sets and each set has one air bag and one or two air valves. The air pump unit comprises an air inlet port and an air exhaust port to provide force for inflation and deflation. The air-inflating and air-pumping switching valve unit consists of the first port, the second port and the third port, wherein the first port and the second port are connected to the air inlet port and air exhaust port of the air pump unit respectively, and the third port is access to the atmosphere or air source of normal pressure. The air-inflating and air-pumping switching valve unit is used for switching the mode of inflating or pumping.

Further, the air-inflating and air-pumping switching valve unit includes triple valve or double valve, and when it comes to the triple valve, the number of triple valves is one or two.

Further, the air-inflating and air-pumping switching valve unit comprises one triple valve and the triple valve is in parallel connection with the air valve unit and the air pump unit.

Further, the air-inflating and air-pumping switching valve unit includes one triple valve and each air valve unit contains an air bag and two air valves, wherein the either sides of the air bag are separately jointed with the air valves.

Further, the air-inflating and air-pumping switching valve unit comprises two triple valves and the air inlet port of the air pump unit is linked with the first port of the first triple valve, and the air exhaust port is access to the first port of the second triple valve.

Further, two the second ports of the two triple valves are connected to the air valve unit simultaneously.

Further, the air valve unit comprises an air bag and an air valve, wherein one of the ports of the air valve is connected to the air bag, while the other port is jointed with the air-inflating and air-pumping switching valve unit.

The embodiment of the present application also provides a method for controlling the inflation and deflation of the air bag, which is implemented by the above-mentioned air bag air-inflating and air-pumping device.

Specifically, when there is one triple valve, the port of the triple valve connected to the air exhaust port of the air pump unit is closed as the air bag is inflated: while the air bag is deflated, the port of the triple valve connected to the air inlet port of the air pump unit is closed. When there are two triple valves, one of them serves as an inlet triple valve for inflation through the port connected to the atmosphere while the other one acts as an exhaust triple valve for deflation through the port connected to the atmosphere.

Further, when the air bag is inflated under the condition that there are two triple valves, the air valve and air pump unit are opened; the first port and the third port of the first triple valve are controlled to connect; the first port and the second port of the second triple valve are connected; and the air bump unit inflates air from the third port of the first triple valve into the air bag.

Further, when the air bag is deflated under the condition that there are two triple valves, the air valve and air pump unit are opened; the first port and the second port of the first triple valve are controlled to connect; the first port and the third port of the second triple valve are connected; and the air bump unit extracts air from the air bag and discharges the air into the atmosphere through the third port of the second triple valve.

Further, when the air bag is inflated under the condition that there is one triple valve, the second air valve is opened and the first air valve is closed; and air pump unit is opened; the first port and the second port of the triple valve are controlled to connect, and the air bump unit inflates air from the first port of the triple valve into the air bag.

Further, when the air bag is deflated under the condition that there is one triple valve, the first air valve is opened and the second air valve is closed; the air pump unit is opened; the first port and the third port of the triple valve are controlled to connect, and the air bump unit extracts air from the air bag and discharges the air into the atmosphere through the first port of the triple valve.

The embodiment of the present application also provides a method for adjusting the air flow among several air bags, which is implemented by the above-mentioned air bag air-inflating and air-pumping device, wherein there is one triple valve set as closed mode or there is no triple valve at all.

Compared with the prior art, the present application has the following beneficial effects: offering an air bag air-inflating and air-pumping device which achieves the re-pumping of the air bag—that is the air bag inflates and deflates with the same air pump—by using the existing air pump with the premise of no extra cost. In this case, the deflation speed of the air bag is faster than it does in a natural way, especially when the air pressure is not high in the air bag, it can remain a rapid and constant deflation speed. At the same time, compared with adding one more air pump to extract the air in the air bag, the air bag air-inflating and air-pumping device in the present application greatly saves the costs and the structural room by inflating and extracting air with the same air pump.

BRIEF DESCRIPTION OF THE DRAWINGS

In order to specifically explain the embodiments of the present application or the technical solutions in the prior art, the figures required in the description of the embodiments or the prior art will be briefly introduced below. However, it is to be appreciated that the following figures are merely some embodiments of the present application, and those skilled in the art can imply other figures based on the provided ones with the premise of no creative effort.

The above-mentioned figures comprising.

Figure 1:
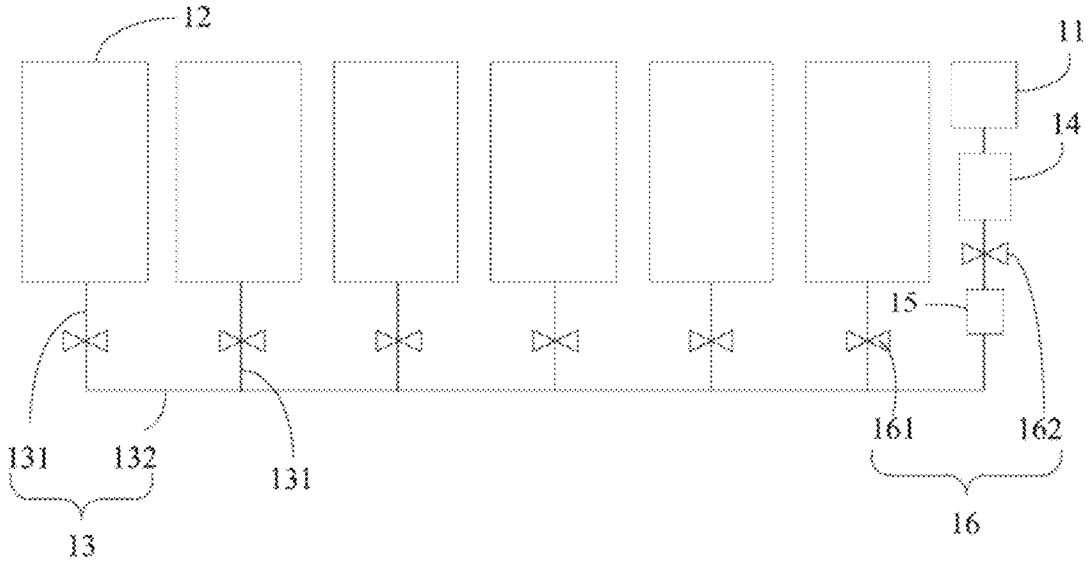
FIG. 1 (Prior Art)
FIG. 1 is a perspective view of a prior art air bag air-inflating and air-pumping device

an air pump (11): an air bag (12); an air pipe (13): a transfer air bag (14): a control device (15): an air valve (16): a discrete air pipe (131): an integral air pipe (132): a discrete air valve (161): an integral air valve (162): an air bag air-inflating and air-pumping device (1); an air valve unit (2): an air valve set (21); an air bag (211): an air valve (212): an first air valve (213); an second air valve (214); an first air bag (215): an second air bag (216): an third air valve (217); an fourth air valve (218): an fifth air valve (219): an sixth air valve (220); an air pump unit (3): an air inlet port (31); an air exhaust port (32): an air pump (33): an air-inflating and air-pumping switching valve unit (4): a first port (41): a second port (42); a third port (43): an first triple valve (441): an second triple valve (442): an third triple valve (443).

DETAILED DESCRIPTION OF THE EMBODIMENTS

In the following description, further specific details are set forth with some embodiments and figures in order to provide a thorough understanding of the technical problems that are to be settled, technical solutions and beneficial effect. However, it is to be appreciated that the following description of the embodiment is merely exemplary in nature and is no way intended to limit the application.

As shown in FIG. 1, it is a perspective view of a prior art air bag air-inflating and air-pumping device which includes an air pump 11, several air bags 12 in parallel connection, an air pipe 13, a transfer air bag 14, a control device 15, and an air valve 16, wherein the air pipe 13 comprises several discrete air pipes 131 and an integral air pipe 132. The air valve 16 consists of variety several discrete air valves 161 and an integral air valve 162. Each air bag 12 is connected to a discrete air pipe 131, and the discrete air pipes 131 are connected in parallel way while every discrete air pipe 131 is linked with the integral air pipe 132 respectively. One of the ports of the control device 15 is jointed with the integral air pipe 132 while the other port of it is connected to the integral air valve 162 to control the open and close of the integral air valve 162. The transfer air bag 14 is located between the air pump 11 and integral air valve 162, which is used for storing air pressure, so as to make it easy to adjust the inflation and deflation of the air bag 12.

In the specific operation, firstly, the transfer air bag 14 is pre-inflated with abundant air through the air pump 11 and then the air pump 11 is closed. When it is inflating, the integral air valve 162 is opened and inflate the corresponding air bag 12 by controlling each discrete air valve 161: when it is deflating, the integral air valve 162 is closed and each discrete air valve 161 is opened to discharge the air in the corresponding air bag 12 into the air through the effect of the air pressure difference, which is deflation in natural way.

The structure of the air bag air-inflating and air-pumping device is simple, which is adjusting the hardness of each air bag by applying air pump and air valve to control the inflation and deflation of each air bag. However, in the process of natural deflation, the air bag faces the problem of inconstant deflation speed and the speed is affected by many factors, for example, the air bag deflation speed will be slow if the air pressure on the air bag is small.

In order to address the above-mentioned problems of the prior art, the embodiment of the present application provides an air bag air-inflation and air-pumping device comprising an air valve unit, an air pump unit and an air-inflating and air-pumping switching valve unit. The air valve unit is connected to the air-inflating and air-pumping switching valve unit that is joint with the air pump unit. Wherein the air valve unit comprises air valve sets and each set has one air bag and one or two air valves, and the air bag is directly connected to the air valve. The air pump unit comprises an air inlet port and an air exhaust port to provide force for inflation and deflation of the air bag. The air-inflating and air-pumping switching valve unit may consist of triple valve or several double valves, and also three ports the first port, the second port and the third port, wherein the third port is access to the atmosphere or air source of normal pressure. By the connection and disconnection of these three ports the switch of the inflation and extraction of air bag can be achieved. The air-inflating and air-pumping switching valve unit may include one or two triple valves, wherein when there are multiple air valve sets (including two or more, they are connected in parallel way. The air valve is used for controlling the connection and disconnection of the air valve set of itself, so that it can control the condition of the air bag in that air valve set: when the air valve is opened, the air bag is inflating or extracting: when the air valve is closed, the air bag stays on its present situation. The accuracy of the adjustment effect of the air bag can be improved by setting several air valve sets, so as to achieve the precise control on each parts of the air bag.

In particular the air pump unit comprises air pump and the number of it can be one and can be several (including two or more). When there are several air pumps, they are in parallel connection.

Figure 2:
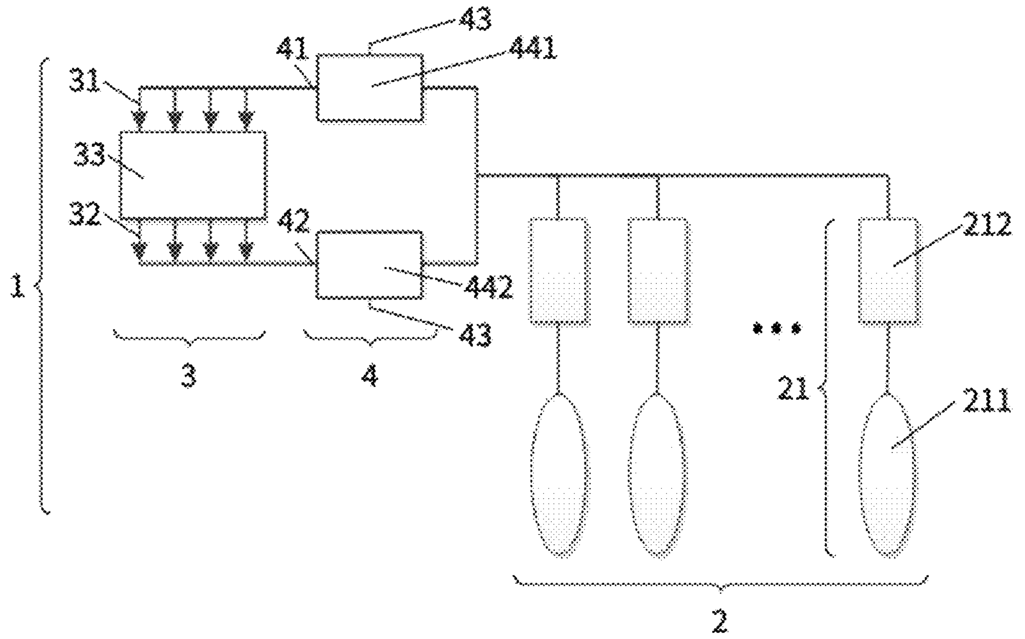
FIG. 2 is a perspective view of an air bag air-inflating and air-pumping device provided by one embodiment in the present application.

In one of the embodiments, there are two triple valves in the air-inflating and air-pumping switching valve unit. Referring to the FIG. 2, the air bag air-inflating and air-pumping device 1 includes an air valve unit 2, an air pump unit 3 and an air-inflating and air-pumping switching valve unit 4, wherein the air valve unit 2 comprising multiple air valve sets 21 in parallel connection and each of them is composed of an air bag 211 and an air valve 212. The air pumping unit 3 has an air pump 33. The air-inflating and air-pumping switching valve unit 4 is composed of two triple valves that are an first triple valve 441, an second triple valve 442. The air bag 211 is linked with the air valve 212 which is connected to the first triple valve and the second triple valve, after the first triple valve and the second triple valve are in parallel connection. The air pump 33 is jointed between the first triple valve 441 and the second triple valve 442, wherein a first port 41 of the first triple valve connects to the air inlet port 31 of the air pump 33 and a second port 42 of the second triple valve is access to the air exhaust port 32 of the air pump 33. The third ports 43 of the first triple valve and t the second triple valve are applied to make an access to the atmosphere or air resource of normal pressure. The fourth ports of the first triple valve and the second triple valve are interconnected to one of the ports of the air valve 212 while the other port of it is linked with the air bag 211.

Specifically, the air valve 212 in the present application is different from the triple valve 44. The air valve 212 is set in the middle of the liner pipe to control the flow and non-flow of the air without changing the direction of the air flow. There are three ports in the triple valve 44, which can alter the direction of the air.

The “direct connection” indicates that there are no other units between the two ones but pipelines for connection.

The air pump 33 applied in the embodiment of the present application functions by electricity, which can use for inflating and extracting air. Compared with adding one more air pump 33 to extract the air in the air bag 211, the air bag air-inflating and air-pumping device 1 in the present application greatly saves the costs and the structural room by inflating and extracting air with the same air pump 33.

In the embodiment of the present application, the number of air bags 211 and air valves 212 can be rose multiply (in groups) according to the actual need of the application, and the multiple air bags 211 are connected in a parallel way.

In which, the public port of both the first triple valve 441 and the second triple valve 442 is the first port 41 and the second port 42 respectively. When the first triple valve 441 is at a low electrical level, the first port 41 and the third port 43 are connected; and when the first triple valve 441 is at a high electrical level, the first port 41 and the fourth port are connected: when the second triple valve 442 is at a low electrical level, the second port 42 and the third port 43 are connected; and when the second triple valve 442 is at a high electrical level, the second port 42 and the fourth port are connected. Setting the electrical level of the first triple valve 441 and the second triple valve 442 can connect or disconnect the three ports of the first triple valve 441 and the second triple valve 442, so that the switching of inflation and deflation of the air bag 211 can be realized. More specifically, when the air bag 221 is inflated, the air valve 212 and the air pump 33 are opened and the latter is for inflation; the first triple valve 441 is adjusted to a low electrical level while the second triple valve 442 is at high electrical level, in which the first port 41 and the third port 43 of the first triple valve 441 are connected and the second port 42 and the fourth port of the second triple valve 442 are jointed—; the air pump 33 inflates air the atmosphere) from the third port 43 of the first triple valve 441 and injects it into the air bag 211. When the air bag 211 is deflated, the air valve 212 and the air pump 33 are opened and the latter is for extracting; the first triple valve 441 is adjusted to a high electrical level while the second triple valve 442 is at a low electrical level, in which the first port and the fourth port of the first triple valve 441 are connected and the second port 42 and the third port 43 of the second triple valve 442 are jointed; the air pump 33 extracts air from air bag 211 and the air in the air bag 211 is discharged into the air through the third port 43 of the second triple valve 442.

When there is no need to inflate or deflate the air bag 211, the air pump 33, the first triple valve 441, the second triple valve 442 and the air valve 212 are all shut down.

The air bag air-inflating and air-pumping device 1 in the embodiment of the present application can inflate or deflate the air bag 211 by applying the inflation and deflation function of the air pump 33 through controlling the connection condition of the first triple valve 441 and the second triple valve 442, which contributes to the rapid and constant speed of inflation and deflation and also make it easy to control. Especially, without adding any extra air pumps, the device achieves the rapid and constant deflation speed of air bag 211 just by using the existing air pump for re-pumping the air bag 211 and changing the connection condition of the first triple valve 441 and the second triple valve 442. As the deflation speed of the air bag 211 depends on the air pump 211 extracting speed and is not influenced by factors such as external pressure and the like, even when the air pressure in the air bag 211 is slightly higher than the atmospheric pressure, the air bag 211 can still keep a higher deflation speed, and the deflation speed can be controlled by the air pump 33 so as to realize deflation of the air bag 211 at a constant speed.

Figure 3:
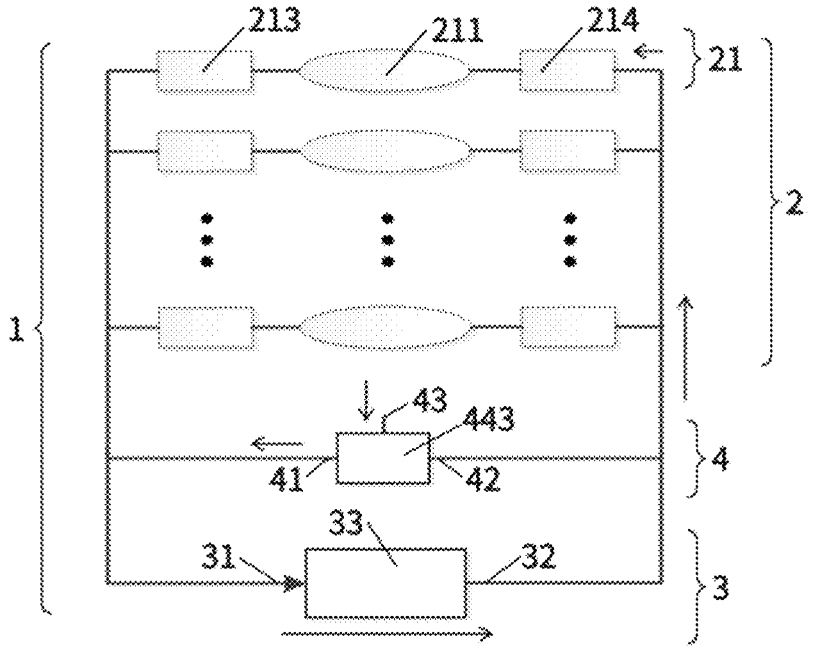
FIG. 3 is a perspective view of an air bag air-inflating and air-pumping device provided by another embodiment in the present application.

FIG. 3 is an air bag air-inflating and air-pumping device 1 provided by another embodiment in the present application, in which just has one triple valve. As shown in FIG. 3, the air bag air-inflating and air-pumping device 1 including an air valve unit 2, an air pump unit 3 and an air-inflating and air-pumping switching valve unit 4, wherein the air valve unit 2 includes multiple air valve sets 21 in parallel connection, and each set is composed of one air bag 211 and two air valves 212, that is the air bag 211 is located between an first air valve 213 and an second valve 214; the air pump unit 2 includes one air pump 33, and the air-inflating and air-deflating switching valve unit 4 includes an third triple valve 443 which is connected to the air bag 211 and air pump 33 in parallel, wherein a first port 41 of the third triple valve 443 is paralleling connected to one port of the first air valve 213 and the air inlet port 31 of the air pump 33, a second port 42 of the third triple valve 443 is paralleling connected to one port of the second air valve 214 and the air exhaust port 32 of the air pump 33. The air bag 211 is located between the other port of the first air valve 213 and the other port of the second air valve 214, and a third port 43 of the third triple valve 443 is access to the atmosphere. In particular, the public port of the t third triple valve 443 is the third port 43.

In the embodiment, the number of the air bags 211, the first air valves 213 and the second air valves 214 (a set of air bag and air valve includes one air bag and two air valves, referring to FIG. 3) can be rose multiply according to the actual need of the application. The more the number is, the more accurate of the adjustment efficiency of the air bag 211 and correspondingly the more costs it will take. Multiple air bags 211 are connected in a parallel way.

When the air bag 211 is inflated, the second air valve 214 is opened and the first air valve 213 is closed; the air pump 33 is open for inflation; the first port 41 and the third port 43 of the third triple valve 443 are connected; the air pump 33 inflates air (the atmosphere) from the third port 43 of the third triple valve 443 and the air is injected into the air bag 211 through second air valve 214 the from air exhaust port 32 (as the arrow-pointed direction in the FIG. 3). When the air bag 211 is deflated, the first air valve 213 is opened and the second air valve 214 is closed; the air pump 33 is open for deflation; the second port 42 and the third port 43 of the third triple valve 443 are controlled to connect; the air pump 33 extracts air from the air bag 211 and the air in the air bag 211 flows out through first air valve 213 and the air exhaust port 32 and finally is discharged into the atmosphere through the third port 43 of the third triple valve 443.

When there is no need to inflate or deflate the air bag 211, the air pump 33, the third triple valve 443, the first air valve 213 and the second air valve 214 are all shut down.

Compared with the above embodiment, the differences of the embodiment of the present application comprises: applying only one triple valve 443, the air valve set 21 including an air bag 211 and two air valves, an air bag 211 lying between two air valves, and the third triple valve 443 connecting to the air valve unit 2 and the air pump unit 3 in parallel way. Similar to the above embodiment, the air bag air-inflating and air-pumping device 1 in the embodiment of the present application also makes the re-pumping a truth by employing the existing air pump 33, which contribute to the fast and constant deflation speed of the air bag 211.

Figure 4:
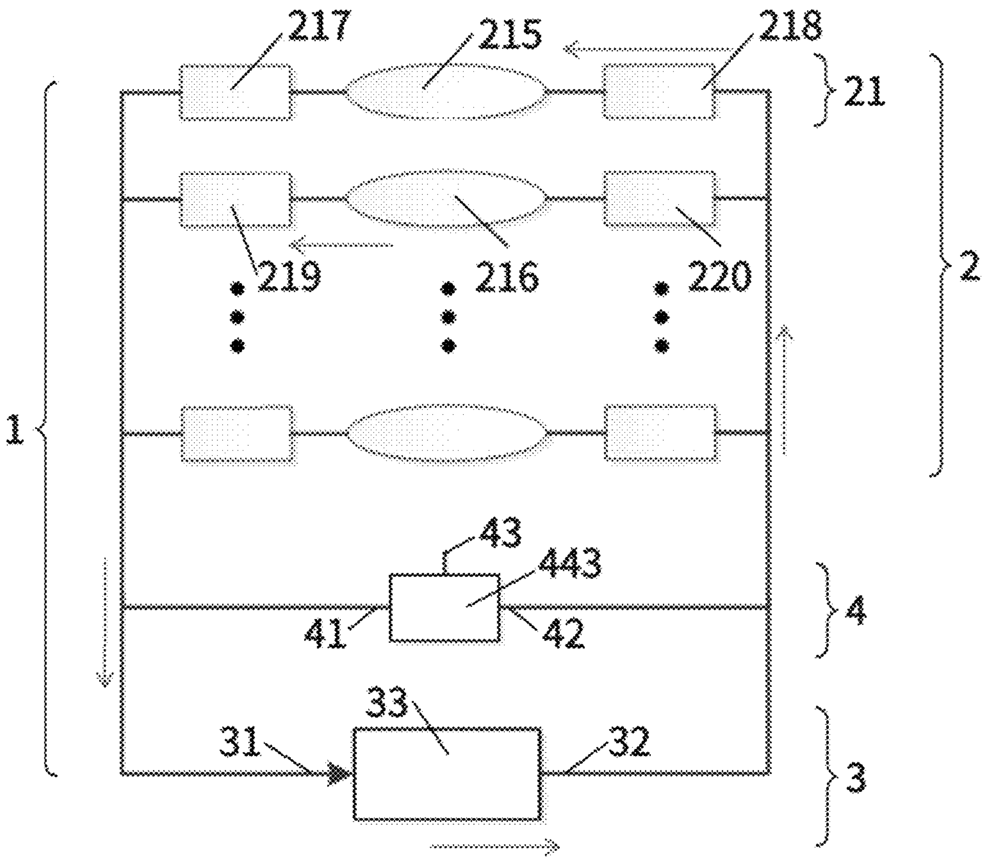
FIG. 4 is a perspective view of an air bag air-inflating and air-pumping device provided by one more embodiment in the present application.

FIG. 4 is a perspective view of another application of the air bag air-inflating and air-pumping device 1 provided by the embodiment of the present application in the FIG. 3. As shown in FIG. 4, the air exchange between two air bags 211 can be achieved by applying the air bag air-inflating and air-pumping device 1 provided by the embodiment of the present application in the FIG. 3, and the third triple valve 443 is closed in this circumstance. When the first air bag 215 needs to be inflated and the second air bag 216 needs to be deflated, the fourth air valve 218 and the fifth air valve 219 is opened and the third air valve 217 and the sixth air valve 220 is closed; the air pump 33 is opened and working for extracting; the air pump 33 inflates air from second air bag 216 and the air flows through the exhaust port 32 and the fourth air valve 218 and finally runs into the first air bag 215 (flowing at the arrow-pointed direction in FIG. 4). When the first air bag 215 needs to be deflated and the second air bag 216 needs to be inflated, the third air valve 217 and the sixth air valve 220 is opened and the fourth air valve 218 and the fifth air valve 219 is closed; the air pump 33 is opened; the air pump 33 inflates air from first air bag 215 and injects it into the second air bag 216.

Specifically, the concrete shape of the air bag 211 in the embodiment of the present application is free from any restriction and it can be square, circle, polygon and so on.

The air bag air-inflating and air-pumping device 1 given by the embodiment of the present application makes it free from inflating air from the atmosphere through exchanging air between two adjacent air bags 211, which improve the efficiency of the inflating and deflating air and also the efficiency of the adjustment of the air bag 211. The embodiment of the present application also provides a method for controlling the inflation and deflation of the air bag 211, which is implemented by the above-mentioned air bag air-inflating and air-pumping device 1. Wherein, when there is one triple valve, the port of the third triple valve 443 connected to the air exhaust port 32 of the air pump unit 3 is closed as the above-mentioned air bag 211 is inflated, while the air bag 211 is deflated, the port of the third triple valve 443 connected to the air inlet port 31 of the air pump unit 3 is closed. When there are two triple valves, one of them serves as an inlet triple valve for inflation through the port connected to the atmosphere while the other one acts as an exhaust triple valve for deflation through the port connected to the atmosphere. For specific control details, refer to the descriptions of the above structure part.

The above descriptions explain the technical solution of the present application under the example of the air-inflating and air-pumping switching valve unit formed by triple valve. It is to be appreciated that the above-mentioned air-inflating and air-pumping switching valve unit formed by triple valve can all be replaced by air-inflating and air-pumping switching valve unit formed by double valve with the same functions.

Thus, it is appreciated that the above-mentioned embodiment is one of the optimum ones, and not used for restricting the present application, and all equivalent relationships to those illustrated in the figures and described in the above description are intended to be encompassed by the present application.

What is claimed is:

1. An air bag inflating device comprising:

an air valve unit, an air pump unit and switching valve unit;

wherein the air valve unit is connected to the switching valve unit and the switching valve unit is connected to the air pump unit;

wherein the air valve unit comprises a plurality of air valve sets connected in parallel, and each of the air valve sets comprises one air bag, a first air valve and a second air valve; the air pump unit comprises an air pump, an air inlet port and an air exhaust port; the switching valve unit comprises one triple valve in parallel connection with the air valve unit and the air pump unit, a first port, a second port and a third port;

wherein the first port is connected in parallel to one end of the first air valve and the air inlet port of the air pump unit, the second port is connected in parallel to one end of the second air valve and the air exhaust port of the air pump unit, and the third port is access to the atmosphere or air source of normal pressure; the air bag is connected between the other end of the first air valve and the other end of the second air valve;

wherein the air pump functions by electricity, and the air bags inflate and deflate with the same air pump.

2. A method for controlling an inflation and deflation of an air bag, wherein the method is implemented by the air bag inflating device of claim 1.

3. The method of claim 2, wherein when the air bag is inflated, the second port and the first air valve are closed, the first port, the third port and the second air valve are open, the air pump draws air from the third port, and the air is inflated into the air bag through the first port, the air inlet port, the air exhaust port and the second air valve; when the air bag is deflated, the first port and the second air valve are closed, the second port, the third port and the first air valve are open, the air pump draws air from the air bag, and the air is exhausted from the first air valve, the air inlet port, the air exhaust port, the second port, and the third port.

* * * * *